United States Patent [19]

Church et al.

[11] 3,726,456

[45] Apr. 10, 1973

[54] CARTRIDGE LOCKING MECHANISM FOR A MINIATURE TAPE PLAYER

[75] Inventors: Victor E. Church, Park Ridge; William B. Huber, Park Forest, both of Ill.

[73] Assignee: Motorola, Inc., Franklin Park, Ill.

[22] Filed: Mar. 31, 1972

[21] Appl. No.: 239,896

[52] U.S. Cl. ......................226/89, 274/4 B, 274/11 B

[51] Int. Cl. ............................................B65h 17/20

[58] Field of Search..........................226/89, 90, 180; 274/4 B, 11 B; 242/19 A

[56] References Cited

UNITED STATES PATENTS

| | | | |
|---|---|---|---|
| 3,492,005 | 1/1970 | Ueno | 274/4 B |
| 3,677,557 | 7/1972 | Ban | 274/4 B |

*Primary Examiner*—Richard A. Schacher

*Attorney*—Vincent J. Rauner et al.

[57] ABSTRACT

A cartridge locking mechanism for a miniature tape cartridge player adapted to receive standard tape cartridges having a beveled side wall portion at the leading end thereof and a notch, includes a rotatably mounted plate member having a cartridge engaging roller mounted thereon for movement into and out of the player in accordance with the rotation of the plate member and a sensing arm mounted for rotation about the axis of rotation of the plate member and coupled to the plate member by a spring which biases the sensing arm into the path of a cartridge received in the player. The sensing arm engages the beveled side wall portion of the cartridge when the latter is inserted into the player to deflect the sensing arm and thereafter cause rotation of the plate member. An overcenter spring also coupled to the plate member moves from a first stable state to a second stable state to in turn move the roller into engagement with the side wall of the cartridge, and upon full insertion of the latter into the player, into the notch in the side wall of the cartridge.

7 Claims, 4 Drawing Figures

PATENTED APR 10 1973

3,726,456

CARTRIDGE LOCKING MECHANISM FOR A MINIATURE TAPE PLAYER

BACKGROUND OF THE INVENTION

This invention relates generally to cartridge-type tape players which include locking mechanisms for securing a cartridge therein and more particularly to a cartridge locking mechanism for use in a tape player adapted to receive a cartridge having a notch or recess formed along a side wall thereof.

It is desirable in a tape player wherein cartridges are inserted, to include means for firmly positioning the cartridge in the player with the tape therein held against the apparatus for drawing the tape through the cartridge and for playing the tape. Such a tape cartridge locking mechanism is shown in copending U.S. application Ser. No. 136,923, filed Apr. 23, 1971 in the name of William B. Huber and assigned to the same assignee as the instant invention.

With the advent of miniature tape cartridge players, which are dimensionally smaller than previous models, less space is available for such cartridge locking mechanisms. In some cases, because of their size, presently used cartridge locking mechanisms such as that mentioned heretofore, are unsuitable for use in such miniature players.

SUMMARY OF THE INVENTION

Accordingly, it is a primary object of the present invention to provide for use in a cartridge-type tape player of small dimensions, a new and improved cartridge locking mechanism.

It is another object of the present invention to provide a cartridge locking mechanism which is dimensionally small and provides a substantial holding force to maintain a tape cartridge secured within a cartridge player in engagement with tape driving and playing instrumentalities.

It is yet another object of the present invention to provide a new and improved cartridge locking mechanism for use in a cartridge-type tape player which is simple in construction, easy to assemble and compact in design.

Briefly, a preferred embodiment of the cartridge locking mechanism according to the invention comprises a triangular plate member mounted for rotation at one of the corners thereof and including a roller member mounted on one of the other corners for movement into and out of a cartridge receiving tunnel of a cartridge tape player through an opening in the side wall of the tunnel, in response to the rotation of the member. A sensing arm is also mounted for pivotal movement at the point of rotation of the triangular member. A foot member at the free end of the sensing arm extends normally into the cartridge receiving tunnel through the above-described opening. A spring member coupling the plate member and sensing arm, biases the latter rotatably toward the tunnel. An overcenter spring is coupled to the third corner of the triangular member and to a stationary mounting point in the tape player. With the overcenter spring in a first stable state, the roller member is maintained outside of the tunnel and the foot member of the sensing arm extends thereinto. Upon insertion of a cartridge into the tunnel entrance, a beveled corner of the cartridge engages the foot member. The spring biased sensing arm is deflected and the foot member rides slidably along the side wall of the cartridge.

Substantially at the time the foot member is engaging a flat surface of the cartridge side wall, sufficient force is provided against the plate member to cause the latter to drive the overcenter spring to a snap-over point. The overcenter spring moves to its second stable state, causing further rotation of the plate member to move the roller into engagement with the side wall of the cartridge. Continued insertion of the cartridge into the tunnel causes the roller to become aligned with and be moved into the recess formed in the cartridge side wall to maintain the cartridge in the player.

Removal of the cartridge from the tunnel forces the roller from the recess and eventually the cartridge locking mechanism is returned to its initial position, with the overcenter spring maintaining the cartridge mechanism in the first stable state.

DETAILED DESCRIPTION OF THE DRAWING

Figure 2:
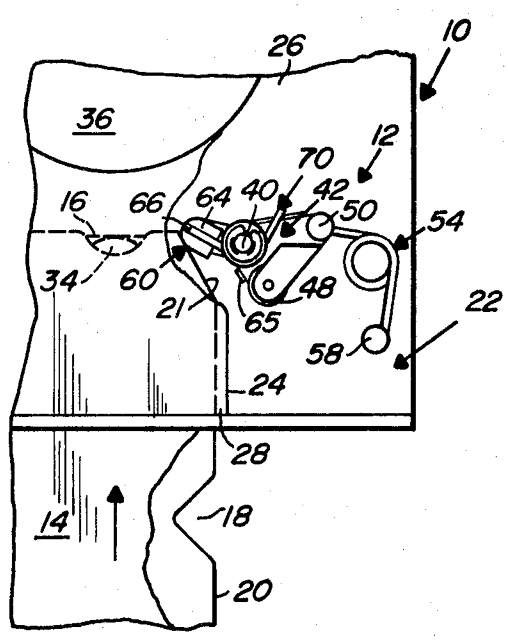
FIGS. 2, 3 and 4 are fragmentary top plan views of a cartridge-type tape player incorporating therein a cartridge locking mechanism according to the invention and illustrating the operation thereof in response to the insertion of a tape cartridge into the player.
Figure 3:
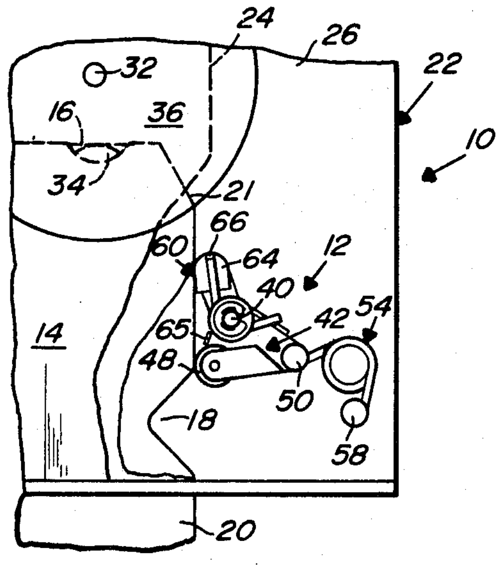
Figure 4:
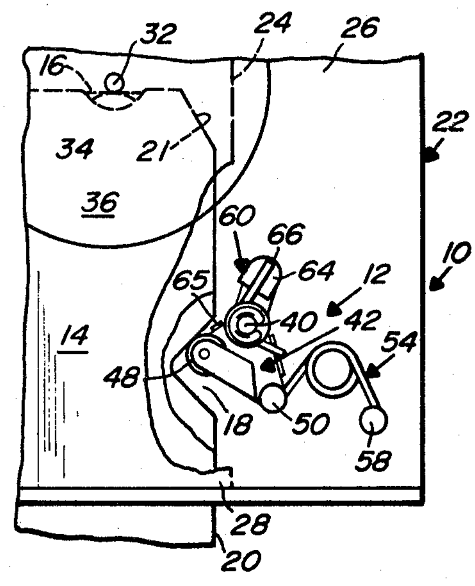

Referring now to the drawing in greater detail wherein like numerals have been employed throughout the various views to designate similar components, there is shown in FIGS. 2–4 a cartridge tape player 10 of small dimensions, conventionally referred to in the industry as a "miniature player," including a cartridge locking mechanism designated generally by the numeral 12, according to the invention.

The tape player 10 is adapted to receive and play a standard tape cartridge 14 having a multi-track tape 16 mounted therein for movement therethrough, and a notch or recess 18 formed along a side wall thereof. The side wall 20 of the cartridge also includes at the leading end, an inclined or beveled surface 21.

Tape player 10 has a cast metal housing or chassis 22 having a pair of side walls, only one 24 of which is shown, interconnected by a base wall 26 to form a cavity or tunnel 28 having an open end through which the cartridge 14 is received in the tunnel. Mounted on wall 26 of chassis 22, in communication with tunnel 28, is a capstan shaft 32 against which a pressure roller 34 of the tape cartridge and over which the tape 16 passes, is pressed upon insertion of the cartridge into the tunnel 28 (see FIG. 4). The capstan shaft 32 is driven in the usual manner by a motor and pulley arrangement (not shown) coupled to a flywheel 36 mounted on the capstan shaft. The tape 16, sandwiched between the capstan shaft and pressure roller, is driven through cartridge 14 past tape playing instrumentalities, such as, for example, a magnetic tape head (not shown), which also is mounted on the wall 26 of the chassis 22 in communication with tunnel 28.

The cartridge locking mechanism 12 according to the invention is mounted on the base wall 26 on a pin 40 extending upwardly therefrom, substantially perpendicular to the plane of base wall 26. The mechanism 12 includes a plate member 42, herein shown as having a substantially triangular shape, including at one corner thereof, an aperture 44 for receiving the mounting pin 40 to facilitate mounting of the plate 42 pivotally thereon. A portion 46 of the plate member is bent over on itself to provide a mounting for a roller 48 which is effectively positioned at one of the other corners of the triangular plate member. The axis of rotation of the roller is perpendicular to the plane of plate member 42 and parallel to mounting pin 40. The third corner of the plate member includes an upwardly extending tab 50 to which one end 52 of an overcenter spring 54 is coupled. The other end 56 of the spring is coupled to a stationary tab 58 extending upwardly from the base wall 26 of chassis 22.

A cartridge engaging or sensing arm 60 is also included in the cartridge locking mechanism. The sensing arm has an aperture 62 extending through a first end thereof for receipt of pin 40 therein to facilitate the mounting of arm 60 for rotation about pin 40. At the free end of arm 60 is a foot member 64 which has smooth outer wall surfaces for engaging, in sliding fashion, the side wall 20 of a cartridge received in the tape player. A center recess 66 is provided in the foot member to receive the end 68 of a coiled biasing spring 70 also mounted on pin member 40. The opposite end 72 of the biasing spring 70 is coupled to the plate member 42 by being lodged between a pair of upstanding tabs 74 thereon located between pin 40 and tab 50. The spring provides a force to bias sensing arm 60 in a counterclockwise direction as viewed in the drawing to move the foot member through an aperture in the side wall 24 of the chassis 22 into the path of a cartridge 14 inserted into the tunnel 28. A tab 65 extending from plate member 42, substantially perpendicular thereto, is provided to engage sensing arm 60 upon insertion of a cartridge into the player 10 to maintain foot member 64 out of engagement with the cartridge 20 when roller 48 is received in notch 18. It is desirable for proper audio performance of the tape player 10 that foot member 64 not engage the side wall of the tape cartridge when the latter is inserted into the player.

Sensing arm 60 and plate member 42 are maintained on pin 40 by a C-washer 76 which is received in a first circumferential slot or groove 78 in pin 40 and the coil biasing spring is maintained on the pin by a second C-washer 80 received in a second circumferential slot 82 nearer the free end of the pin. Washers 84, 86 are provided between C-washers 76 and coil spring 70 and the latter spring and C-washer 80, respectively.

For purposes of affording a more complete understanding of the invention, it is advantageous now to provide a functional description of the mode in which the component parts thus far described cooperate.

Referring to FIG. 2 of the drawing, cartridge 14 is shown being inserted in the direction of the arrow into the open end of tunnel 28. Upon initial insertion of the cartridge into tunnel 28, a leading beveled or inclined portion 21 of the side wall 20 of cartridge 14 engages foot member 64 of the cartridge sensing arm 60 extending into tunnel 28 through an opening in side wall 24. The force provided against foot member 64 by the movement of cartridge 14 into the open end of tunnel 28 causes rotation of sensing arm 60 in a clockwise direction as viewed in the drawing, against the force of biasing spring 70. Prior to or at about the time foot member 64 passes the beveled portion 21 of side wall 20, the force provided by cartridge 14 against spring 70 is transferred through end 72 of the last-mentioned spring to plate member 42. The plate member is thereby rotated or pivoted about pin 40 sufficiently to move roller 48 toward the side wall 20 of the cartridge (see FIG. 3).

Figure 1:
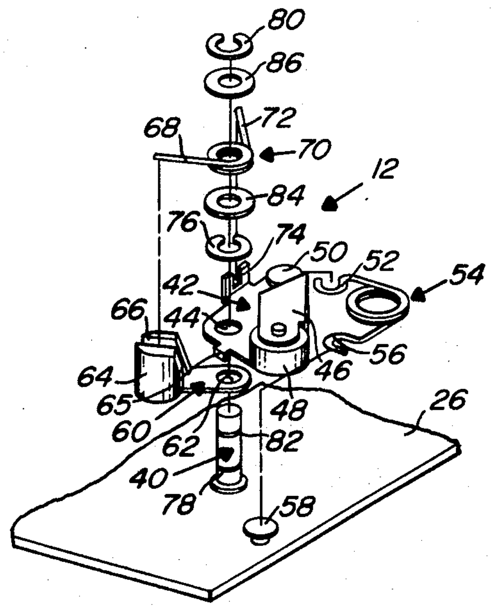
FIG. 1 is an enlarged exploded view of a cartridge locking mechanism according to the invention.

Further insertion of cartridge 14 into tunnel 28 causes overcenter spring 54 to move past the snap-over or overcenter position from the first stable state of FIG. 1 to a second stable state, FIG. 4. Roller 54 engages the cartridge wall 20 and thereafter enters notch 18 through the opening in side wall 24 when the notch becomes aligned with the roller to maintain the cartridge in position with the pressure roller 34 thereof in engagement with the capstan shaft 32 (FIG. 4).

The cartridge need only be inserted into tunnel 28 to the point of initial entry of roller 48 into notch 18, since the force provided by overcenter spring 54 is sufficient to move roller into notch 18 and to drive the cartridge 14 into the fully inserted position of FIG. 4.

When the cartridge is withdrawn from tunnel 28, the roller 48 is forced from the notch 18 causing plate member 42 to be pivoted in a counterclockwise direction as seen in the drawing. Roller 48 rolls along side wall 20 of the cartridge and foot member 64 of the sensing arm 60 slides therealong as well, until the biasing spring 70 is released sufficiently to permit plate member 42 to be pivoted to a point whereat overcenter spring 70 snaps-over from the second stable state to the first stable state. When the last-mentioned action occurs, roller 48 is quickly brought to the position of FIG. 1 and foot member 64 of sensing arm 60 returns to its position within tunnel 28.

Thus, the cartridge locking mechanism according to the invention provides an effective means for removably securing a tape cartridge in a tape player of small dimensions. The cartridge locking mechanism takes up a minimum of space within the player chassis, yet provides as much if not greater cartridge holding force than a standard cartridge locking mechanism to maintain a tape cartridge in engagement with the driving and playing components of the player.

While a particular embodiment of the invention has been shown and described, the invention is not limited thereto since many modifications thereof can be made. It is therefore contemplated to cover by the present application any and all such modifications as fall within the true spirit and scope of the appended claims.

We claim:

1. A cartridge locking mechanism for a tape player having a chassis defining a tunnel for receiving a tape cartridge and instrumentalities for driving and playing a recording tape in the cartridge upon insertion of the latter into the tunnel, said cartridge locking mechanism including in combination:

a plate member being mounted adjacent a side wall of said tunnel for rotation about an axis extending therethrough substantially perpendicular to the plane of said plate member, a cartridge engaging member mounted on said plate member, said plate member being rotatable about said axis between a first position whereat said cartridge engaging member is positioned outside of said tunnel and a second position whereat said cartridge engaging member extends through an opening in the side wall of said tunnel for engagement with a cartridge inserted into said tunnel, overcenter spring means coupled to said plate member, movable to first and second bistable conditions, and a cartridge sensing arm mounted for pivotal movement about the axis of rotation of said plate member and biasing means resiliently coupling said sensing arm to said plate member, one end of said sensing arm extending through an opening in the side wall of said tunnel into the path of a cartridge received in said tunnel, said one end being engaged by said cartridge upon insertion of the latter into said tunnel for deflecting said sensing arm against said resilient biasing means to rotate said plate member about said axis, thereby moving said overcenter spring means to a snap-over position, whereby the latter moves from said first to said second stable state, causing said cartridge engaging member to be moved into said tunnel for engagement with said tape cartridge.

2. A cartridge locking mechanism as claimed in claim 1 wherein said cartridge includes an inclined side wall portion near the leading end thereof for deflecting, gradually, said sensing arm upon insertion of said cartridge into said tunnel, and a recess formed in said side wall for receipt of said cartridge engaging member upon insertion of said cartridge fully into said tunnel, said cartridge engaging member being forced from said recess upon withdrawal of said cartridge from said tunnel to move said overcenter means from said second to said first stable state, whereby said cartridge engaging member is moved outside of said tunnel.

3. A cartridge locking mechanism as claimed in claim 2 wherein said cartridge engaging member includes a roller mounted for rotation on said plate member about an axis substantially perpendicular to the plate of said plate member.

4. A cartridge locking mechanism as claimed in claim 3 wherein said overcenter spring means includes a spring member, one end of which is coupled to said plate member and the other end of which is coupled to said tape player chassis and wherein said sensing arm includes a foot member at said one end thereof extending into said cartridge receiving tunnel for sliding engagement with the side wall of a cartridge received in said tunnel.

5. A cartridge locking mechanism as claimed in claim 4 wherein said plate member is triangular in shape and is rotatable about a first corner thereof, wherein said roller member is mounted on said plate member at a second corner thereof, wherein said overcenter spring mechanism is coupled to said plate at the third corner thereof and wherein said resilient biasing means coupling said sensing arm to said plate member includes a coil spring member having a first outwardly extending end coupled to said foot member and a second end coupled to said plate member between said first and third corners thereof.

6. A cartridge locking mechanism for a tape player having a chassis including a pair of side walls and a base wall interconnecting said side walls defining a tunnel for receiving a tape cartridge having an inclined side wall portion at the leading end thereof and a notch formed in said side wall portion, and instrumentalities for driving a recording tape through the cartridge upon insertion of the latter into the tunnel, including in combination: a mounting pin extending from the base wall of said chassis substantially perpendicular to the plane thereof, adjacent a first one of the side walls of said cartridge receiving tunnel, a plate member being mounted on said mounting pin for rotation thereabout, said pin extending substantially perpendicular to the plane of said plate member, a cartridge engaging roller mounted for rotation on said plate member about an axis substantially perpendicular to the plane of said plate member, said plate member being rotatable about said mounting pin between a first position whereat said roller is positioned outside of said cartridge receiving tunnel and a second position whereat said roller extends through an opening in said first one of said side walls into the path of a cartridge inserted into said tunnel, overcenter spring means coupled to said plate member movable to first and second stable conditions for maintaining said roller in said first and second positions, respectively, a cartridge sensing arm mounted for pivotal movement at a first end thereof on said mounting pin and a biasing spring coupled at a first end thereof to said sensing arm and at the opposite end to said plate member for biasing said sensing arm toward said opening in said side wall, with the free end of said sensing arm extending into the cartridge receiving tunnel in the path of a cartridge received therein, the free end of said sensing arm being engaged by the inclined side wall portion of said cartridge upon insertion of the latter into said tunnel, said sensing arm being rotated thereby against the force of said biasing spring to in turn rotate said plate member about said mounting pin, thereby causing said overcenter spring to snap from said first to second condition to move said roller into said tunnel into engagement with the side wall of said tape cartridge, further insertion of said cartridge into said tunnel causing said roller to enter said notch formed in the cartridge side wall, thereby to maintain said cartridge in said tunnel in driving engagement with said tape driving instrumentalities.

7. A cartridge locking mechanism as claimed in claim 6 wherein said plate member is substantially triangular in shape and is mounted for rotation about said mounting pin at a first corner thereof, wherein said roller is mounted on said plate member at a second corner thereof and wherein said overcenter spring means is coupled to said plate member substantially at the third corner thereof.

* * * * *